United States Patent
Ralev (10) Patent No.: US 8,009,555 B2
(45) Date of Patent: Aug. 30, 2011

(54) MECHANISM FOR TRANSPARENT REAL-TIME MEDIA SERVER FAIL-OVER WITH IDLE-STATE NODES

(75) Inventor: Vladimir Angelov Ralev, Bourgas (BG)

(73) Assignee: Red Hat, Inc., Raleigh, NC (US)

( * ) Notice: Subject to any disclaimer, the term of this patent is extended or adjusted under 35 U.S.C. 154(b) by 125 days.

(21) Appl. No.: 12/392,904

(22) Filed: Feb. 25, 2009

(65) Prior Publication Data

US 2010/0214908 A1    Aug. 26, 2010

(51) Int. Cl.
    *G06F 11/00*    (2006.01)
(52) U.S. Cl. ........ 370/217; 370/221; 370/463; 370/503; 709/208; 709/223; 709/248
(58) Field of Classification Search .................. None
    See application file for complete search history.

(56) References Cited

U.S. PATENT DOCUMENTS

| 5,987,621 A * | 11/1999 | Duso et al. ............... 714/4 |
| 6,104,695 A * | 8/2000 | Wesley et al. ............ 370/216 |
| 6,240,105 B1 * | 5/2001 | Zetts ........................ 370/503 |
| 7,106,843 B1 * | 9/2006 | Gainsboro et al. ....... 379/191 |
| 7,804,953 B1 * | 9/2010 | Antonios et al. ......... 379/266.08 |
| 2006/0122939 A1 * | 6/2006 | Cohen et al. ............. 705/59 |
| 2007/0291678 A1 * | 12/2007 | Chowdhury et al. ..... 370/328 |
| 2008/0239946 A1 * | 10/2008 | Morita ...................... 370/217 |

* cited by examiner

*Primary Examiner* — Chi H. Pham
*Assistant Examiner* — Shick Hom
(74) *Attorney, Agent, or Firm* — Lowenstein Sandler PC (57) ABSTRACT

In one embodiment, a mechanism for transparent real-time media server fail-over with idle-state nodes is disclosed. In one embodiment, a method includes replicating a start time of a request related to a bidirectional stream of media sent to an original master media server, receiving notification of selection as a new master media server after failure of the original master media server, determining an offset time by subtracting the replicated request start time from a current time, and resuming playback of the request at the offset time within the request.

22 Claims, 5 Drawing Sheets

MECHANISM FOR TRANSPARENT REAL-TIME MEDIA SERVER FAIL-OVER WITH IDLE-STATE NODES

TECHNICAL FIELD

The embodiments of the invention relate generally to media servers for a telecommunications platform and, more specifically, relate to a mechanism for transparent real-time media server fail-over with idle-state nodes.

BACKGROUND

With the continued progress of globalization, more corporations than ever before have workgroups spread across countries and continents across the world. To support and increase the productivity of remote and telecommuting workgroups, communications companies are considering more cost effective network services and solutions that combine voice, wireless, data and video functionality. Acquiring these desired network services and solutions requires connections from the Internet and wireless and wireline networks to Public Switched Telephone Networks (PSTNs) using a flexible, robust, scalable and cost-effective media gateway.

Today, all communications can be routed through computers. Widespread access to broadband Internet and the ubiquity of Internet Protocol (IP) enable the convergence of voice, data and video. Media gateways provide the ability to switch voice media between a network and its access point. Using Digital Subscriber Line (DSL) and fast-Internet cable technology, a media gateway converts, compresses, and packetizes voice data for transmission back-and-forth across the Internet backbone for wireline and wireless phones. Media gateways sit at the intersection of the PSTNs and wireless or IP-based networks.

Multiple market demands are pushing companies to converge all of their media services using media gateways with VoIP capabilities. As such, the development of media servers has allowed this convergence of media services into media gateways with VoIP capabilities. A media server is responsible for sending a continuous stream of data representing audio, video or other media in real-time. Often times, high-availability for these systems are desired. To obtain high-availability more than one server is run, with one of them operating as the master (serving the clients directly) and the others operating in standby mode (called "backup nodes"). If the master fails, a new master is selected from the backup nodes to serve clients. This switch from old master to new master is called fail-over. Transparent fail-over is when the clients do not notice the switch between servers.

In order to achieve transparent failover, the backup nodes must be aware of what the master is sending at any time. This typically requires all requests to be executed on all nodes simultaneously and the state of the master to be replicated to the other nodes so that they are ready to take over the master at any time. Usually, this is achieved via a standard technique to synchronize all of the servers by replicating the current buffer/segment of the data that is being sent through all of the back-up nodes. This synchronization is done many times every second. Unfortunately, executing all requests on all nodes is a time and resource consuming process for the media server. Therefore, a mechanism to provide time and resource efficient transparent fail-over for media server nodes would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention provide a mechanism for transparent real-time media server fail-over with idle-state nodes. In one embodiment, a method of transparent real-time media server fail-over with idle-state nodes includes replicating a start time of a request related to a bidirectional stream of media sent to an original master media server, receiving notification of selection as a new master media server after failure of the original master media server, determining an offset time by subtracting the replicated request start time from a current time, and resuming playback of the request at the offset time within the request.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for transparent real-time media server fail-over with idle-state nodes. The mechanism for transparent real-time media server fail-over with idle-state nodes reduces the resources needed to achieve transparent fail-over by having backup media server nodes only keep track of two items for fail-over purposes: (1) what requests arrive at a master media server and (2) at what time they arrive. Embodiments of the invention are based on the concept of "state=time". When a media server node knows the request time, it will also know from where to resume the request by subtracting the request start time from the time of failure (i.e., the current time). Because the request time is known by all nodes, no other state information of the master media server needs to be replicated to the backup media servers in order for transparent fail-over to operate correctly. As a result, valuable time and resources can be conserved.

Figure 1:
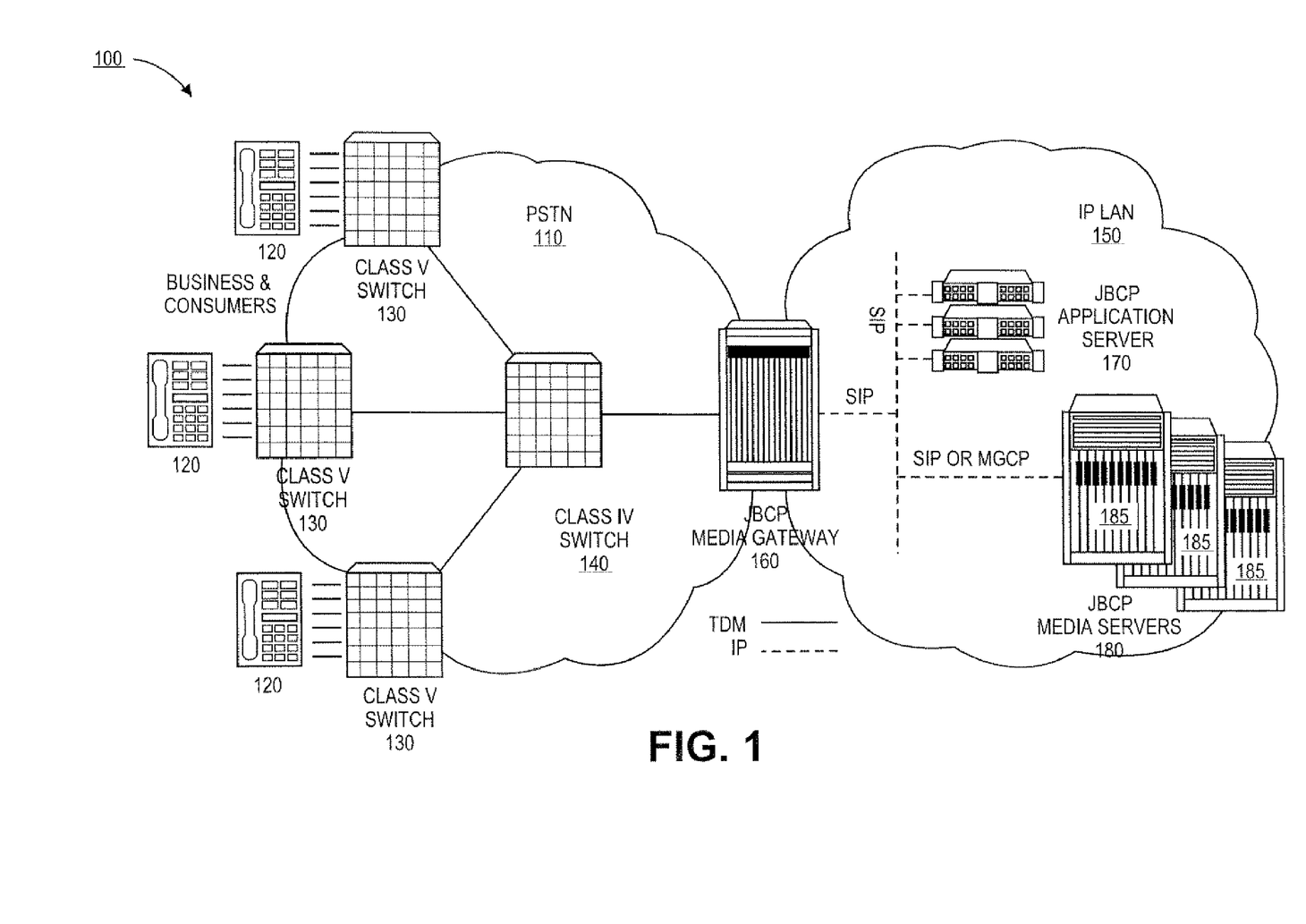
FIG. 1 is a block diagram of a communications network implementing transparent real-time media server fail-over with idle state nodes according to an embodiment of the invention.

FIG. 1 is a block diagram of a communications network 100 implementing transparent real-time media server fail-over with idle state nodes according to an embodiment of the invention. Communication network 100 includes a Public Switched Telephone Network (PSTN) 120 and an Internet Protocol Local Area Network (IP LAN) 130. The PSTN 120 transports circuit-switched signals, while the IP LAN transports IP packets.

Within the PSTN 120, one or more businesses or consumers may place calls via telephones 120. Telephones 120 are connected to class V switches 130. Class V switches 130 are telephone switches or exchanges that directly serve subscribers. The class V switches 130 are in turn connected to a class IV switch 140. The Class IV switch 140 is a tandem switch or exchange connecting the various areas of a city or towns in a region, and is not directly connected to the end user or subscriber.

The class IV switch 140 is connected to the IP LAN 150 via a Media Gateway 160. In one embodiment, the media gateway 160 is a JBoss Communications Platform server. One task of the media gateway 160 is to convert PSTN signals into IP packets and vice versa. The media gateway 160 may also operate as a Session Border Controller at the boundaries of the IP LAN 150.

IP LAN 150 may also include one or more application servers 170, such as JBoss™ application servers. Lastly, the IP LAN 150 may include one or more high-availability media servers 180 that may reside on the same or different computing devices. In one embodiment, the media servers 180 are Mobicents™ Media Servers.

Media servers 180 offer a complete media gateway and server solution. Some capabilities of media servers 180 include, but are not limited to, digital signal processing to convert and compress voice circuit-switched signals into IP packets, announcement access points, conferencing, and high-level interactive voice response (IVR) engines. Media servers 180 are typically controlled by an external application server 180, such as a JBoss Communications Platform (JBCP) application server, which implements call control logic. In embodiments of the invention, media servers 180 each include a transparent real-time fail-over module 185 that implements transparent real-time fail-over with idle-state nodes, as further described below.

Figure 2:
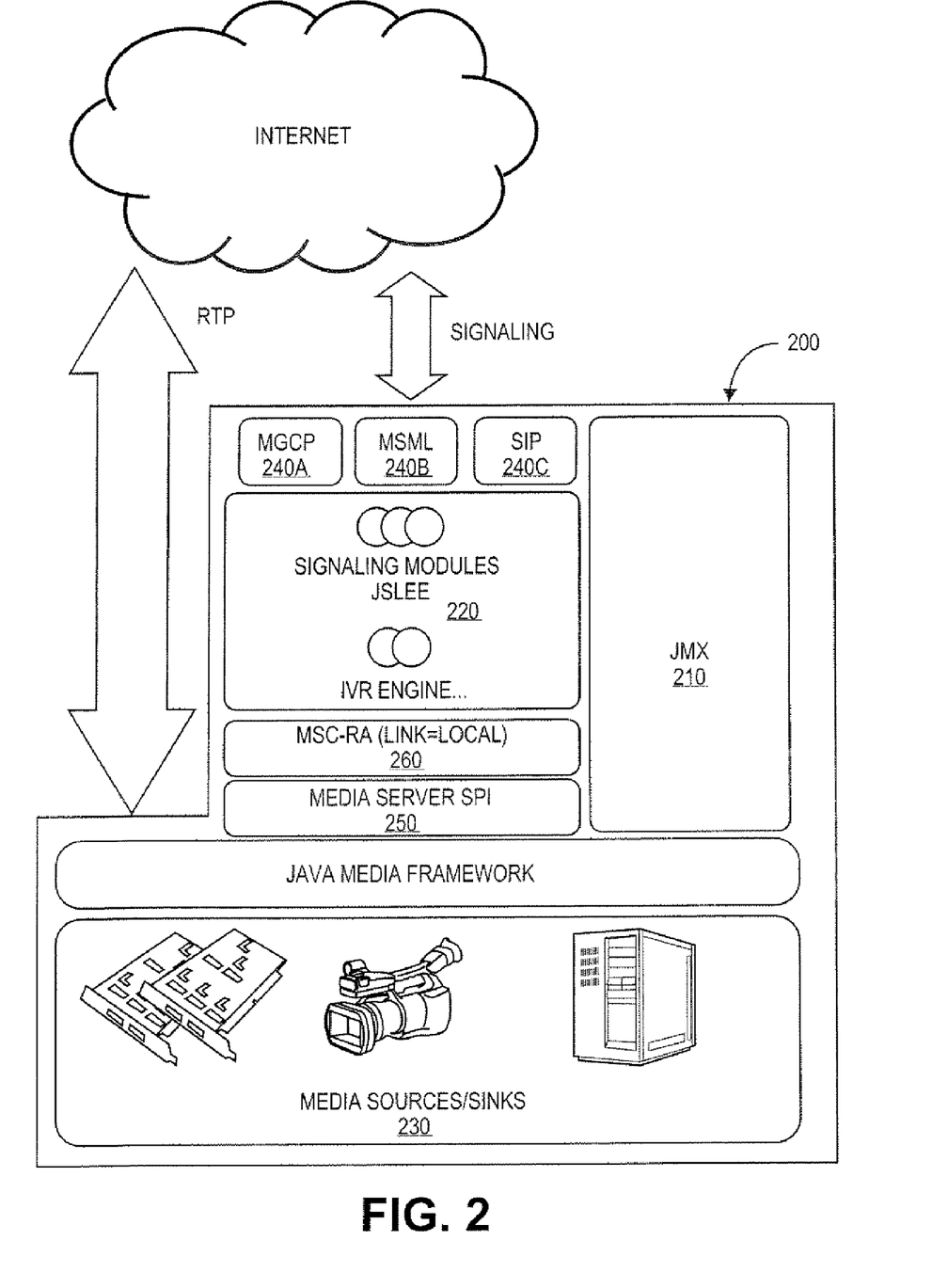
FIG. 2 is a block diagram of a media server capable of implementing transparent fail-over with idle-state nodes according to an embodiment of the invention.

FIG. 2 is a block diagram showing further detail of a media server 200 capable of implementing transparent fail-over with idle-state nodes according to an embodiment of the invention. In one embodiment, media server 200 is the same as media server 180 described with respect to FIG. 1. In some embodiments, as shown in FIG. 2, media server 200 is developed on top of existing JAVA technologies. The JAVA platform offers a single, unifying programming model that can connect all elements of a business infrastructure. The modularization effort may be supported by the use of the JAVA Management Extension (JMX) Application Programming Interface (API) 210, and the industry-standard Service Logic Execution Environment (SLEE) container 220. Using JMX 210 enables easy management of both the media server's media components 230 and the control modules hosted by SLEE 220.

In one embodiment, the media server 200 uses SLEE 220 for implementing its own communication capabilities. The SLEE container 200 does not serve as a call controller. In addition to control protocol modules, the SLEE container 220 is aimed at providing high-level features like Interactive Voice Response (IVR) and Drools or VoiceXML engines. The modules deployed under SLEE 220 control interact with the Media Server Service Provider Interface (SPI) 250 through the Media Server Control Resource Adapter, or MSC-RA 260. The MSC-RA 260 follows the recommendations of JSR-309 and implements asynchronous interconnection with the Media Server SPI stack 250.

Figure 3:
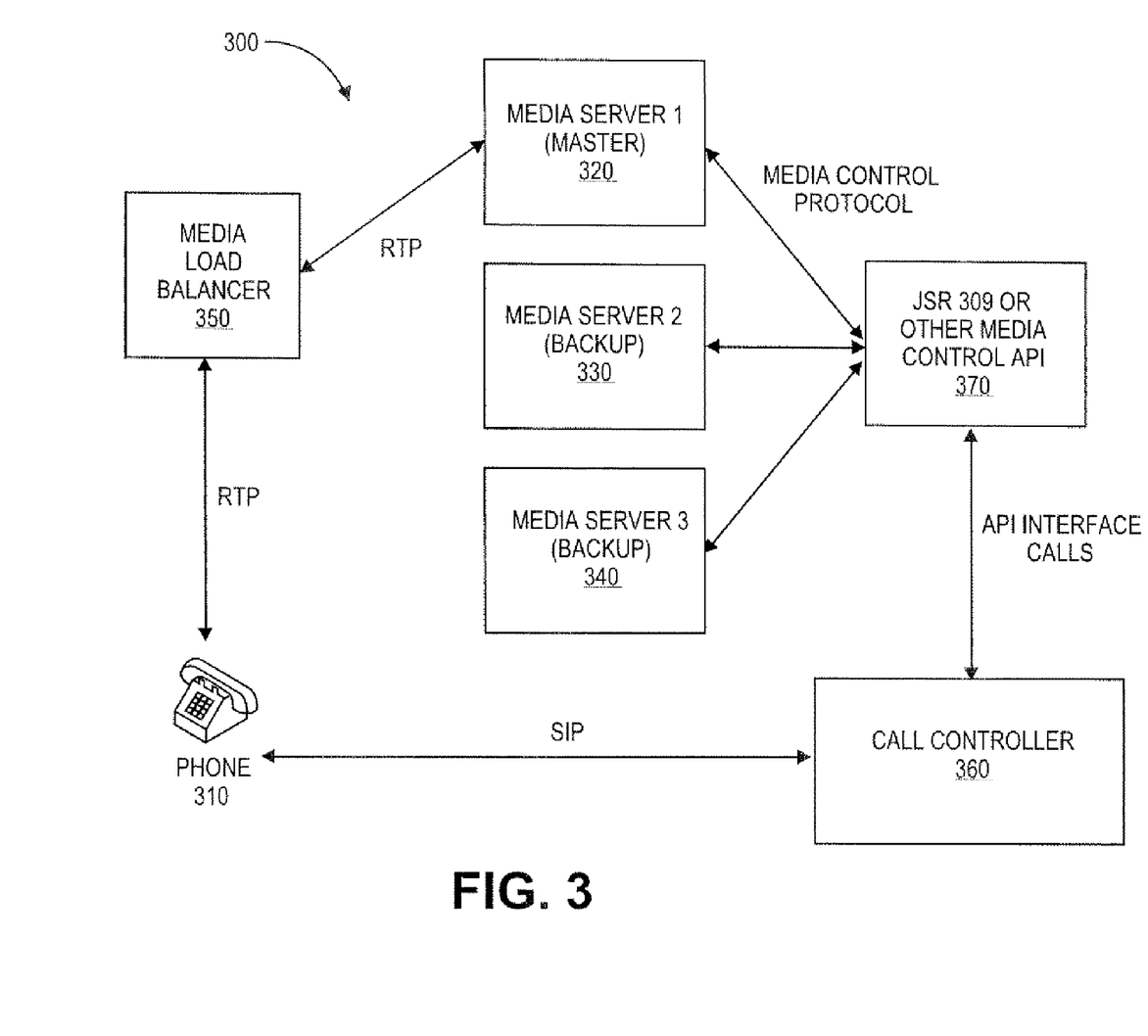
FIG. 3 is a block diagram of a high-availability media server system implementing transparent real-time failover with idle-state nodes according to an embodiment of the invention.

FIG. 3 is a block diagram of a high-availability media server system 300 implementing transparent real-time failover with idle-state nodes according to an embodiment of the invention. Media server system 300 includes a caller 310 to initiate a bidirectional stream of media (e.g., audio, video, etc.) with a master media server 320. Two other media servers 330, 340 serve as back-up media servers to provide transparent fail-over capabilities in the media server system 300. In one embodiment, media servers 320, 330, 340 are the same as media server 200 described with respect to FIG. 2. One skilled in the art will appreciate that more than two media servers may provide back-up capabilities to a master server, and the present depiction is provided for ease of explanation and is not meant to be limiting.

The connection between the phone 310 and the media server 320 is over Real-Time Transport Protocol (RTP), which carries audio and video, for example. Along with the RTP connection, the phone 320 is connected to the call controller 360 over Session Initiation Protocol (SIP). The SIP connection between the phone 310 and the call controller 360 is established first and the settings on how to establish the RTP connection between the Media Server and the Phone are negotiated via this connection. Then the RTP connection is established.

In one embodiment, a load balancer 340 may be utilized to balance media stream loads between the media servers 320, 330, 340. In one embodiment, the load balancer 340 may be a component that front ends media server 320, 330 and 340 and may be implemented as hardware (e.g., circuitry, dedicated logic, programmable logic, microcode, etc.), software (such as instructions run on a processing device), or a combination thereof.

In addition, a media server controller 360 external to the media servers 320, 330, 340 may command the media servers to execute various operations, such as playing a file or playing some sequence of signals. In one embodiment, the controller 360 oversees the implementation of transparent media server fail-over with idle-state nodes by the media servers 320, 330, 340. The controller 360 is the application where the logic and the rest of the call state is located.

In one embodiment, the controller 360 application may be hosted in a SIP Servlets or a JAIN SLEE (JSLEE) container, which have other means of replicating state and failover. The controller 360 is responsible for the SIP(Session Initiation Protocol) portion of the communication with the phone 310. The media server 320, 330, 340 is responsible for the media part (e.g., RTP) of the communication, which occurs after the SIP session is established. The call controller is the application, which controls the media server 320, 330, 340 over JSR 309 interface or some other media server control interface, such as MGCP for example.

Once a call is initiated by the caller 310, it is answered by the master media server 320, which simulates a callee. Endpoints (not shown) in the media server 320 are capable of doing things like playing announcements or detecting key presses and other events, and forwarding them on to the call controller 360. The state associated with the call includes an address of the caller 310, what buttons the caller 310 has pressed, or what events the caller 310 has produced in the past. The media server 320 itself does not keep history (state) of these events; it just forwards them to an application.

The state that is kept in the media server 320 includes, but is not limited to, how much time has elapsed if there is an announcement playback occurring, the progress of an event being generated by the media server 320 (such as if the event is a dual tone multi-frequency (DTMF) signal), and the way endpoints of the media server 320 are connected to the caller 310 and to each other (changes in the way these are connected occur rarely, so replicating them is not an issue at all). Previously, this state was replicated in all of the backup media servers 330, 340 in the system 300. However, embodiments of the invention present a technique to avoid replicating the state of a master media server 320 among all of its backup media servers 330, 340.

With transparent media server fail-over of embodiments of the invention, if a master media server 320 fails, the other back-up media servers 330, 340 are waiting to replace it. Upon failure, a new master is selected by the controller 360 from the back-up media server nodes 330, 340. Assume for purposes of illustration that back-up media server 330 is selected as a new master. When media server 330 is selected as the new master, it needs to know how to resume the media stream at the exact same location where the first master 320 failed. Typically, the media servers 320, 330, 340 were synchronized via a standard technique that involved replicating the current buffer/segment of the media that was currently being sent out through all of the back-up nodes. This was done many times every second because the media was sent in a continuous real-time stream that changed every 20 ms. However, as previously mentioned, such a synchronization technique was not optimal as it was time and resource intensive.

In contrast, embodiments of the invention provide a technique that reduces the resources needed to achieve transparent fail-over by having backup media servers keep track of two items for fail-over purposes: (1) what requests arrive at a master media server and (2) at what time they arrive. Embodiments of the invention are based on the concept of "state time". When a media server node 320, 330, 340 knows the time, it will also know from where to resume. Because the time is known by all media server nodes 320, 330, 340, no other state information of the master media server node 320 needs to be replicated to the backup nodes 330, 340 in order for transparent fail-over of embodiments of the invention to operate correctly.

For example, assume the media server nodes 320, 330, 340 receive a request R to play a file at time T1. In response, the master node 320 starts to stream the file immediately. Then, at a time T1+N the master node 320 fails and a new node 330 is selected as master. The new node 330 already knows about the request R and the time T1, as this information was previously replicated to all backup nodes 330, 340. It also knows the current time (Tc) (i.e., the failure time) from its system clock and, as a result, can determine the place in the file where it should resume at. This time is at the offset (Tc−T1) in the file. As a result, the backup nodes 330, 340 do not need to be operating at all the times in order to resume the playback of a file. Instead, they can start reading the file and data only when it is needed upon failure of a master node 320.

Embodiments of the invention are not limited to solely file playback operations. They may also be used to fail-over any scheduled requests and signal generators. For example, a scheduled request may include a request that arrives and instructs that after 10 seconds a call must be forwarded to another client. An example of a signal generator includes a DTMF signal sequence to be generated on the line, such as when an end user sends a request with the numbers "1234". The scheduled request or signal generator tones may be performed at any media server node, no matter if fail-over occurs, as soon as all nodes know at what state they must resume the scheduled request or signal generation.

Figure 4:
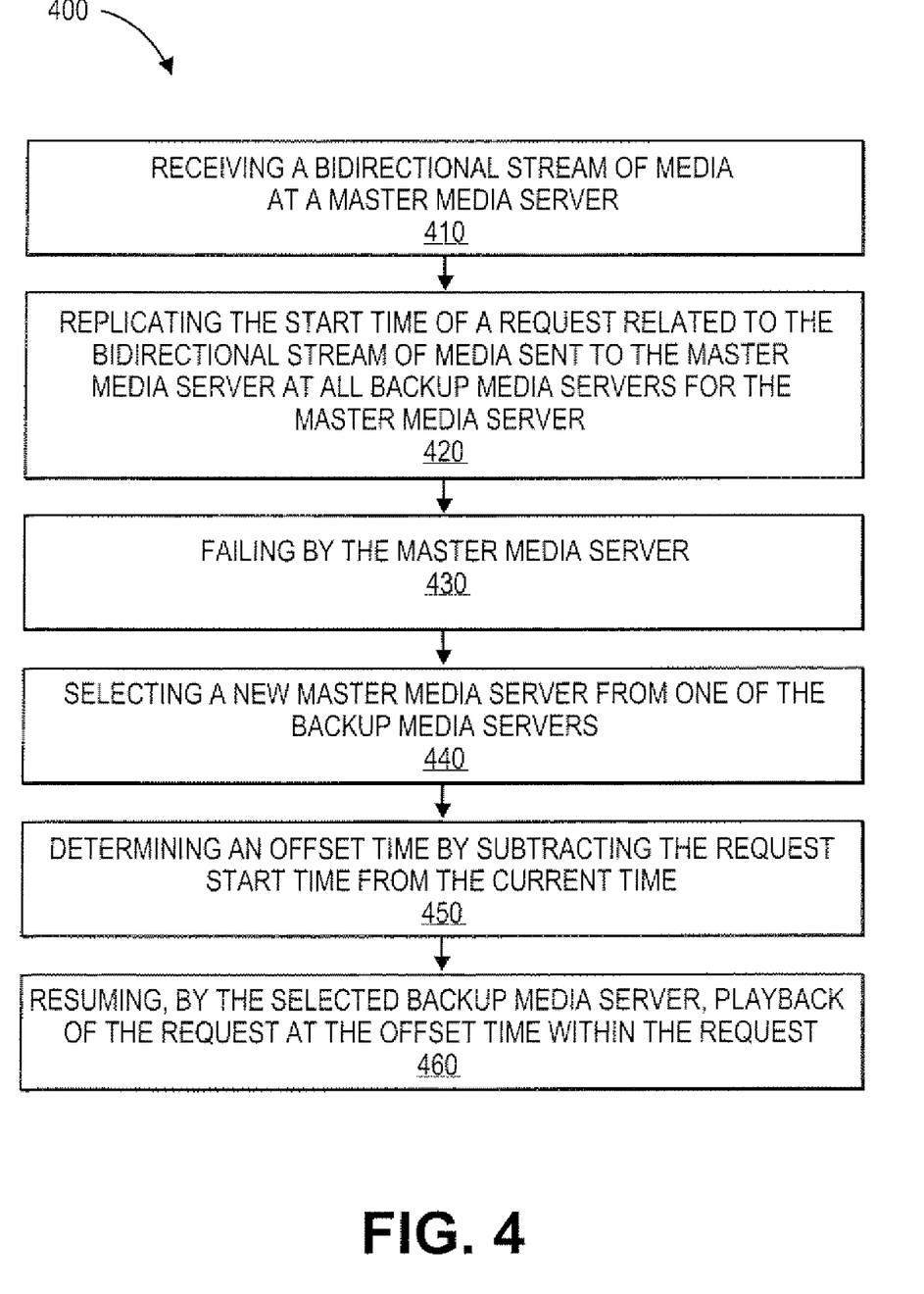
FIG. 4 is a flow diagram illustrating a method for transparent media server fail-over with idle-state nodes according to an embodiment of the invention.

FIG. 4 is a flow diagram illustrating a method 400 for transparent media server fail-over with idle-state nodes according to an embodiment of the invention. Method 400 may be performed by processing logic that may comprise hardware (e.g., circuitry, dedicated logic, programmable logic, microcode, etc.), software (such as instructions run on a processing device), or a combination thereof. In one embodiment, method 400 is performed by media server system 300 of FIG. 3.

Method 400 begins at block 410 where a bidirectional stream of media is received at a master media server. At block 420, a start time of a request related to the bidirectional media is replicated at each backup media server for the master media server. In one embodiment, the request may include, but is not limited to, a file playback, a scheduled request, and signal generation. Then, at block 430, the master media server fails. As a result of the master media server failure, a new master media server is selected from one of the backup media servers at block 440. The selection process of a new master media server node is well known by one skilled in the art and beyond the scope of this application.

At block 450, an offset time is determined by the new master media server by subtracting the request start time, which was previously replicated at the new master media server, from the time of failure (i.e., current time). Finally, at block 460, the new master media server resumes playback of the request at the determined offset time within the request. For example, if the request was for playback of a welcome-.wav file, the new master media server would determine the time within the welcome.wav file that is the same as the difference between the requested start time and the current time, and resume playback from this point in the file.

As shown in method 400, none of the backup media servers for a master media server are required to replicate the state of the master media server. Instead, the backup media servers only need to replicate a start time of a request and what the request is. As a result, embodiments of the invention provide an efficient and resource-friendly technique for transparent failover by letting backup nodes remain idle instead of duplicating the efforts of the master media server in step-by-step in real-time.

Figure 5:
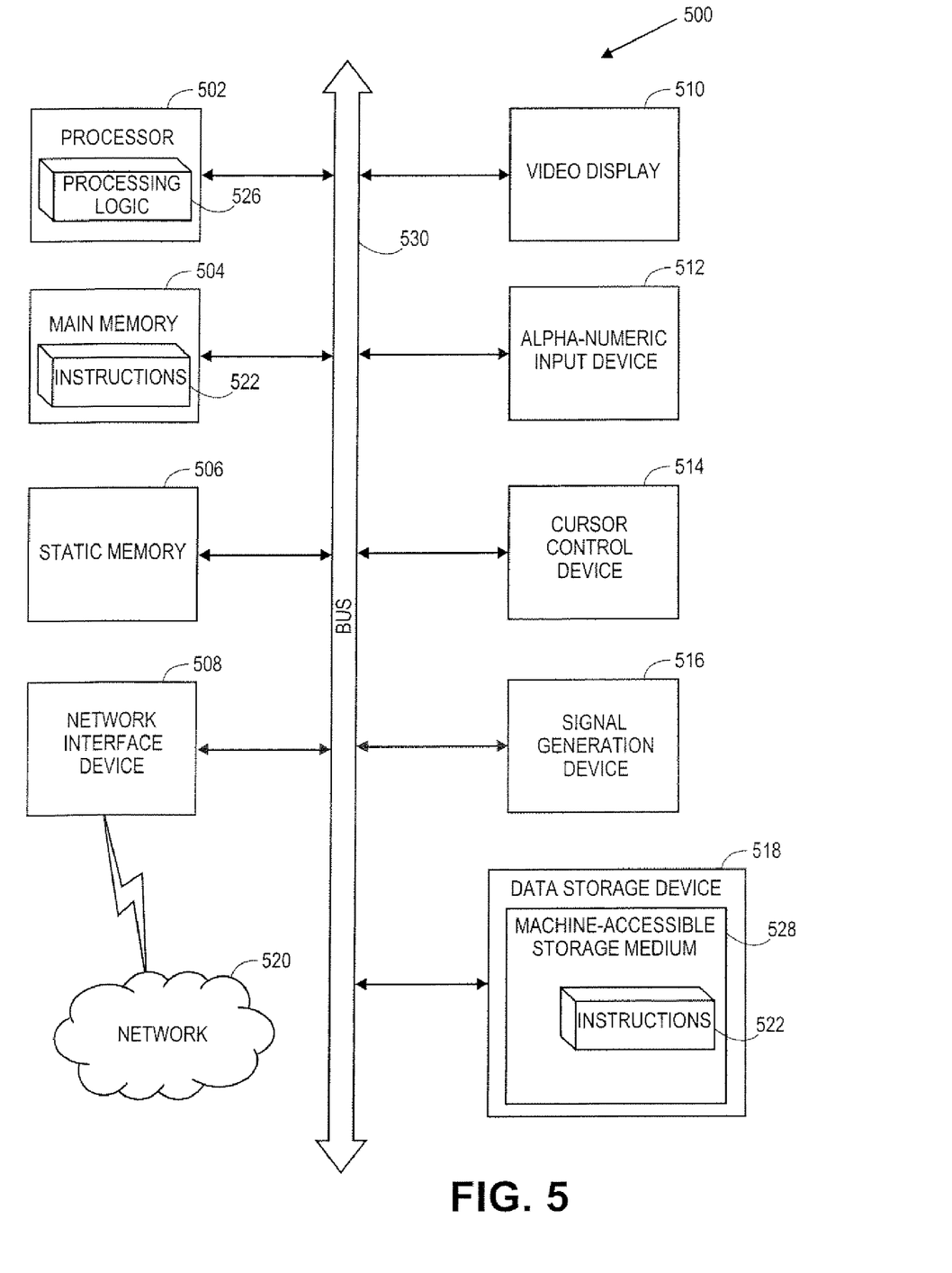
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an internet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 528 on which is stored one or more set of instructions (e.g., software 522) embodying any one or more of the methodologies of functions described herein. The software 522 may also reside, completely or at least partially, within the main memory 504 and/or within the processing device 502 during execution thereof by the computer system 500; the main memory 504 and the processing device 502 also constituting machine-accessible storage media. The software 522 may further be transmitted or received over a network 520 via the network interface device 508.

The machine-readable storage medium 528 may also be used to stored instructions to perform transparent media server fail-over with idle-state nodes described with respect to FIG. 4, and/or a software library containing methods that call the above applications. While the machine-accessible storage medium 528 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A computer-implemented method performed by a new master media server, comprising:
replicating a start time of a request related to a bidirectional stream of media sent to an original master media server, wherein the original master media server performs playback of the request at the start time;

receiving notification of selection as the new master media server after failure of the original master media server;

remaining idle until both of the failure of the original master media server and the selection as the new master media server;

determining an offset time by subtracting the replicated request start time from a current time; and resuming playback of the request at the offset time within the request.

2. The method of claim 1, wherein the request includes at least one of playback of a file, a scheduled task, and generation of a dual tone multi-frequency (DTMF) sequence signal.

3. The method of claim 1, wherein the original master media server and the new master media server are developed on a JAVA platform.

4. The method of claim 3, wherein the original master media server and the new master media server utilize a JAVA Management Extension (JMX) Application Programming Interface (API) and a Service Logic Execution Environment (SLEE) container.

5. The method of claim 1, wherein the original master media server and the new master media server are controlled by a JBoss™ Communications Platform (JBCP) application server.

6. The method of claim 1, wherein the original master media server receives the bidirectional stream of media from a media gateway.

7. A system, comprising:
a media server controller;
a master media server controlled by the media server controller to receive a bidirectional stream of media from a caller; and
a backup media server coupled to the master media server and controlled by the media server controller, the backup media server operable to:
replicate a start time of a request related to the bidirectional stream of media, wherein the master media server performs playback of the request at the start time;
receive notification from the controller of selection as a new master media server after failure of the master media server;
remain idle until both of the failure of the master media server and the selection as the new master media server;
determine an offset time by subtracting the replicated request start time from a current time; and
resume playback of the request at the offset time within the request.

8. The system of claim 7, wherein the request includes at least one of playback of a file, a scheduled task, and generation of a dual tone multi-frequency (DTMF) sequence signal.

9. The system of claim 7, wherein the master media server and the new master media server are developed on a JAVA platform.

10. The system of claim 9, wherein the master media server and the new master media server utilize a JAVA Management Extension (JMX) Application Programming Interface (API) and a Service Logic Execution Environment (SLEE) container.

11. The system of claim 7, wherein the controller is a JBoss™ Communications Platform (JBCP) application server.

12. The system of claim 7, wherein the master media server receives the bidirectional stream of media from a media gateway communicably coupled to the master media server and the backup media server.

13. An article of manufacture comprising a non-transitory machine-readable storage medium including data that, when accessed by a machine, cause the machine to perform operations comprising:
replicating a start time of a request related to a bidirectional stream of media sent to an original master media server, wherein the original master media server to perform playback of the request;
receiving notification of selection as a new master media server after failure of the original master media server;
remaining idle until both of the failure of the original master media server and the selection as the new master media server;
determining an offset time by subtracting the replicated request start time from a current time; and
resuming playback of the request at the offset time within the request.

14. The article of manufacture of claim 13, wherein the request includes at least one of playback of a file, a scheduled task, and generation of a dual tone multi-frequency (DTMF) sequence signal.

15. The article of manufacture of claim 13, wherein the original master media server and the new master media server are developed on a JAVA platform.

16. The article of manufacture of claim 15, wherein the original master media server and the new master media server utilize a JAVA Management Extension (JMX) Application Programming Interface (API) and a Service Logic Execution Environment (SLEE) container.

17. The article of manufacture of claim 13, wherein the original master media server and the new master media server are controlled by a JBoss™ Communications Platform (JBCP) application server.

18. The method of claim 1, wherein the request start time is replicated by the new master media server, wherein the notification of selection as the new master media server is received by the new master media server, wherein the offset time is determined by the new master media server, and wherein the playback is resumed by the new master media server.

19. The method of claim 1, wherein the new master media server does not execute all of the requests received by the original master media server and does not replicate the state of the original master media server.

20. The system of claim 7, wherein the backup media server does not execute all of the requests received by the master media server and does not replicate the state of the master media server.

21. The article of manufacture of claim 13, wherein the request start time is replicated by the new master media server, wherein the notification of selection as the new master media server is received by the new master media server, wherein the offset time is determined by the new master media server, and wherein the playback is resumed by the new master media server.

22. The article of manufacture of claim 13, wherein the new master media server does not execute all of the requests received by the original master media server and does not replicate the state of the original master media server.

* * * * *